United States Patent
Holdsworth

(10) Patent No.: US 7,412,420 B2
(45) Date of Patent: Aug. 12, 2008

(54) SYSTEMS AND METHODS FOR ENROLLING A TOKEN IN AN ONLINE AUTHENTICATION PROGRAM

(75) Inventor: John Holdsworth, Johannesburg (ZA)

(73) Assignee: U.S. Encode Corporation, San Diego, CA (US)

( * ) Notice: Subject to any disclaimer, the term of this patent is extended or adjusted under 35 U.S.C. 154(b) by 545 days.

(21) Appl. No.: 10/346,733

(22) Filed: Jan. 16, 2003

(65) Prior Publication Data

US 2005/0033703 A1    Feb. 10, 2005

Related U.S. Application Data

(63) Continuation of application No. 10/338,822, filed on Jan. 7, 2003, now abandoned.

(60) Provisional application No. 60/409,422, filed on Sep. 9, 2002.

(51) Int. Cl.
*G06Q 40/00* (2006.01)
*G06F 7/04* (2006.01)
*G06K 5/00* (2006.01)
*H04K 1/00* (2006.01)
*H04L 9/00* (2006.01)
*G06F 1/00* (2006.01)

(52) U.S. Cl. ............... 705/44; 705/64; 705/65; 705/66; 705/70; 705/76; 726/9; 235/380

(58) Field of Classification Search ............ 726/9, 726/20; 380/229; 713/172, 173, 174, 185; 705/44; 235/380

See application file for complete search history.

(56) References Cited

U.S. PATENT DOCUMENTS

| | | | |
|---|---|---|---|
| 4,223,403 A | 9/1980 | Konheim et al. | |
| 4,723,284 A | 2/1988 | Munck et al. | |
| 4,774,399 A | 9/1988 | Fujita et al. | |
| 5,943,423 A | 8/1999 | Muftic | |
| 6,026,166 A | 2/2000 | LeBourgeois | |
| 6,076,167 A | 6/2000 | Borza | |
| 6,263,446 B1 | 7/2001 | Kausik et al. | |
| 6,970,852 B1 | 11/2005 | Sendo et al. | |
| 7,031,470 B1 | 4/2006 | Bar-On | |
| 2003/0005291 A1* | 1/2003 | Burn | 713/159 |
| 2003/0018580 A1 | 1/2003 | Drummond et al. | |

(Continued)

FOREIGN PATENT DOCUMENTS

EP    1480105 A2  * 11/2004

OTHER PUBLICATIONS

Abhilasha Bhargav-Spantzel, Jungha Woo, Elisa Bertino, "Receipt Management-Transaction History Based Trust Establishment", Nov. 2007, DIM '07: Proceedings of the 2007 ACM workshop on Digital identity management, pp. 82-91☐☐.*

(Continued)

*Primary Examiner*—Emmanuel L Moise
*Assistant Examiner*—Courtney D Fields
(74) *Attorney, Agent, or Firm*—Baker & McKenzie LLP

(57) ABSTRACT

An online transaction system configured to implement authentication methods that allow for strong multi-factor authentication in online environments. The authentication methods can be combined with strong security methods to further ensure that the authentication process is secure. Further, the strong multi-factor authentication can be implemented with zero adoption dependencies through the implementation of automated enrollment methods.

18 Claims, 12 Drawing Sheets

U.S. PATENT DOCUMENTS

| | | |
|---|---|---|
| 2003/0055738 A1 | 3/2003 | Alie |
| 2003/0135751 A1 | 7/2003 | O'Donnell et al. |
| 2003/0212642 A1* | 11/2003 | Weller et al. ............... 705/67 |
| 2003/0218066 A1* | 11/2003 | Fernandes et al. ........... 235/449 |
| 2004/0059590 A1 | 3/2004 | Mercredi et al. |

OTHER PUBLICATIONS

Aaron Donovan, "A Thicket of Numbers to Stop Theft," Responsible Party.

International Search Report for related PCT International Application No. PCT/US03/27189, filed Aug. 28, 2003.

A.J. Menezes, P.C. Van Oorschot, S.A. Vanstone Handbook of Applied Cryptography (Aug. 2001) CRC Press, Section 10.5 "Attacks on Identification Protocols".

T. Aura "Strategies Against Replay Attacks" Computer Security Foundations Workshop, 1997. Proceedings., 10th. Jun. 10-12, 1997, pp. 59-68.

* cited by examiner

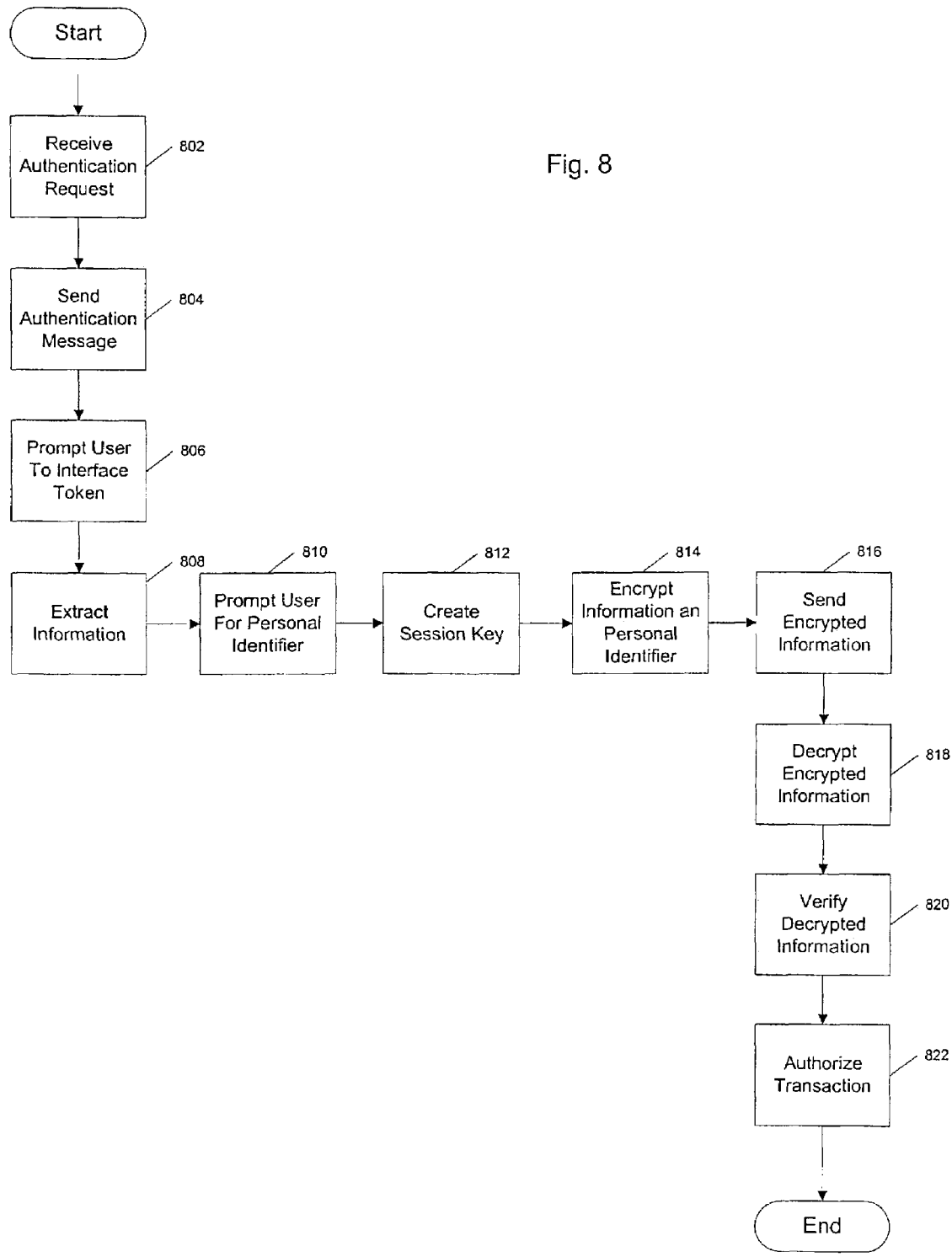

SYSTEMS AND METHODS FOR ENROLLING A TOKEN IN AN ONLINE AUTHENTICATION PROGRAM

RELATED APPLICATIONS INFORMATION

This application claims priority under 35 U.S.C. §119 to U.S. Provisional Application Ser. No. 60/409,422, entitled "Authentication of Online Transactions," filed Sep. 9, 2002, which is incorporated by reference in its entirety as if set forth herein. This application also claims priority as a continuation under 35 U.S.C. §120 to U.S. patent application Ser. No. 10/338,822, entitled "Systems and Methods for Secure Authentication of Electronic Transactions," filed Jan. 7, 2003 now abandoned. This application is also related to the following copending U.S. patent application Ser. No. 10/346,732, entitled "Systems and Methods for Authentication of Electronic Transactions," filed Jan. 16, 2003 U.S. patent application Ser. No. 10/346,708, entitled "A Token for Use in Electronic Transactions," filed Jan. 16, 2003, U.S. patent application Ser. No. 10/347,114, entitled "A Token for Use in Online and Offline Transactions," filed Jan. 16, 2003.

BACKGROUND

1. Field of the Inventions

The field of the invention relates generally to electronic transactions and more particularly to the authentication of such transactions.

2. Background Information

Electronic transactions, including electronic commerce, are becoming more prevalent, fueled of course by increasing Internet use. As the number and type of electronic transactions increase, so to does the need to verify the identity of participants in these transactions. Electronic commerce provides a good example. In a typical electronic commerce scenario, a user uses a web browser running on their computer to access a merchants web page via the Internet. Once the user has accessed the web page, they can typically browse product offerings, select products for purchase, and then purchase the selected products. The purchasing step often requires the user to supply identifying information, e.g., name and address, and a charge account number against which the transaction can be charged.

Unlike an off-line transaction, however, the merchant has no ability to verify the identifying information supplied in the electronic commerce scenario. In other words, in an electronic commerce transaction, the merchant cannot verify that the user is who they say they are, or therefore that the charge account belongs to the user making the purchase. In fact, the Gartner Group estimates that in 2001 1.14% of the $61.8 billion in online transactions involved fraud. The resulting $776.34 million dollars in losses is 5-20 times the losses for off-line sales transactions. With U.S. households predicted to spend $184 billion on-line by the year 2004, such losses clearly present a serious problem that is only going to get worse.

Fear of fraud, however, may prevent on-line sales from rising to predicted levels. The Gartner group estimates that 1 in 20 on-line customers are victims of credit card fraud. As a result, Jupiter Media reports that 60% of users avoid using their credit card in online transactions. Further, fraud losses often fall on the merchant, even though the merchant currently has no way to verify the identity provided by the user. Thus, both users and merchants need greater protection from fraud.

In response, many major credit card associations have promulgated new authentication mandates to reduce the massive losses resulting from online credit card fraud. While these mandates do not necessarily provide an increased ability to verify the identity of the user, they do shift the liability for fraud to card issuers. Accordingly, card issuers need to reliably authenticate their users when the users are involved in an online transaction.

Essentially, the new mandates allow merchants to request that the issuer authenticate the transaction, i.e., verify the identity of the user. The issuer can then, for example, verify the account number and some form of personal identifier, such as a Personal Identification Number (PIN), presented by the user. Once verified, the issuer will authenticate the transaction; however, the issuer is also liable if it turns out that the user is not who they are supposed to be.

Unfortunately for issuers, verification methods currently available still fail to match that of off-line transactions. In an off-line transaction, there is strong two factor authentication. The first factor being the actual presence of the card (card present), the second factor being the ability to verify that the person is who they say they are, e.g., via a signature, PIN, photo identification, etc. The combination of physical card presence and evidence of identification can provide sufficient authentication to reduce fraud to acceptable levels. But in the online environment, the first factor—card present verification—is often not available. Therefore, it is difficult even with the new authentication mandates to achieve a satisfactory level of authentication.

Physical, or actual, card present detection should be discerned from a card present detection generated in compliance with some of the new mandates. For example, in some of the new mandates, the user provides their account number, which is verified. The user is then requested to supply a PIN. If the PIN verifies correctly, then a "card present" indication is generated; however, the actual presence of the card was not in fact verified. In other words, these new mandates at best provide a surrogate card present verification that is inferior to an actual card present verification.

Smart cards, i.e., cards with a special integrated circuit embedded in them, and smart card readers are currently available to address the card present issue in online transactions. A smart card reader can be purchased and connected with a user's computer. During an online transaction, the user can then insert the smart card into the smart card reader, which can then authenticate the smart card.

There are, however, several drawbacks to smart card technology. For example, the user must become educated about how to use the smart card. The user is also often required to purchase a smart card reader and attempt to interface the reader with their computer. Alternatively, the user may be forced to pay extra for a computer with a smart card reader already attached or installed. The cost of an exemplary smart card reader can be, for example, $40. And once interfaced with the user's computer, software must typically be downloaded into the smart card reader, which again requires some education of the user regarding how to download and configure the software. Thus, adoption of smart card technology has been slow, e.g., as low as 1% market penetration or lower, and therefore not very effective at reducing fraud.

SUMMARY OF THE INVENTION

An electronic transaction authentication system allows for multi-factor authentication to reduce fraud and increase the reliability of identity verification. In one aspect, the presence of a card, or token, during an electronic transaction can be authenticated using standard equipment and, therefore, does not require any custom hardware. The token can be configured to work with standard input/output devices for a plurality of terminals that can be used in electronic transactions.

These and other features, aspects, and embodiments of the invention are described below in the section entitled "Detailed Description of the Preferred Embodiments."

BRIEF DESCRIPTION OF THE DRAWINGS

Features, aspects, and embodiments of the inventions are described in conjunction with the attached drawings, in which:

FIG. 8 is a flow chart illustrating a method for authenticating an online transaction in accordance with an example embodiment of the invention;

DETAILED DESCRIPTION OF THE PREFERRED EMBODIMENTS

To help better understand the systems and methods described herein, some specific examples involving electronic commerce over the Internet, i.e., online transactions, are examined below. It should be remembered, however, that the examples provided are not intended to limit the systems and methods described to electronic commerce or Internet implementations. Rather, the systems and methods described can be implemented for any type of electronic transaction that requires authentication.

Figure 1:
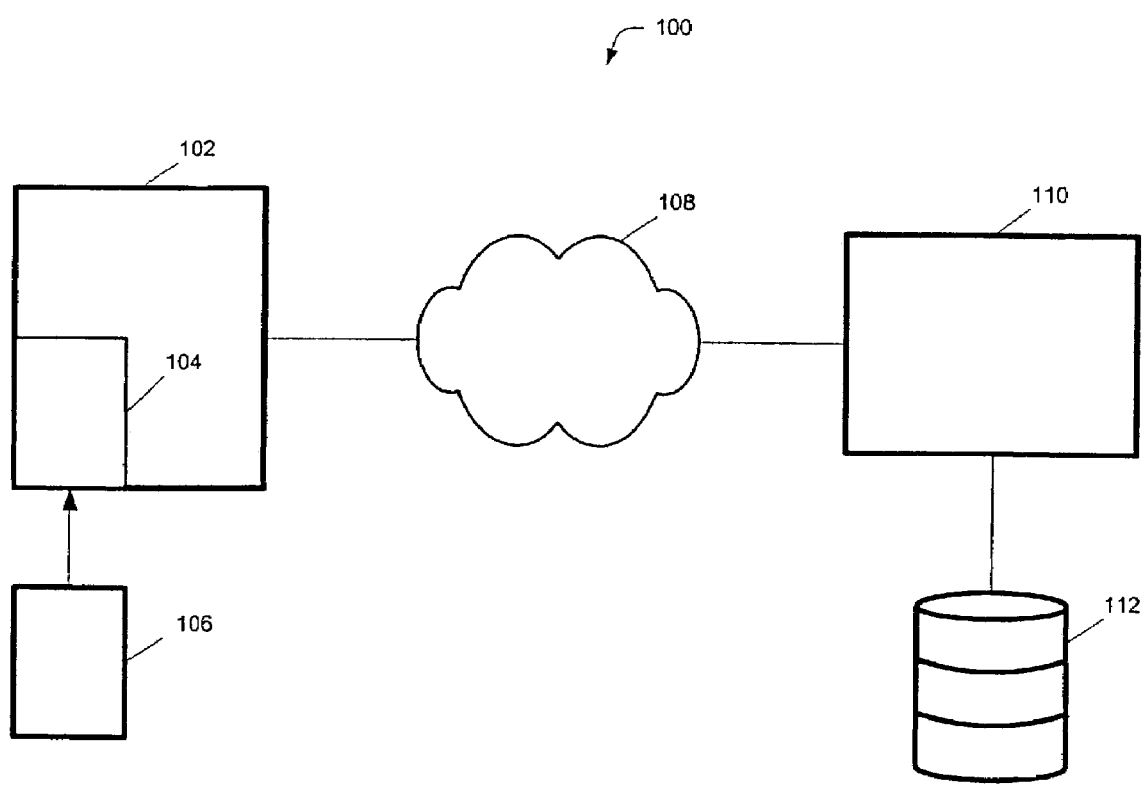
FIG. 1 is a diagram illustrating an online transaction system in accordance with an example embodiment of the invention.

FIG. 1 is a diagram illustrating an example embodiment of an online transaction system 100 configured in accordance with one embodiment of the systems and methods described herein. System 100 comprises a terminal 102 that is configured to engage in an online transaction. Terminal 102 can also be configured to communicate through a communication network 108 with an authentication authority 110 configured to authenticate the electronic transaction. Network 108 can also be used to engage in the online transaction. Alternatively, terminal 102 can be configured to engage in the online transaction over another network.

Network 108 can, for example, be the Internet, but it can also be some other type of network. Network 108 can, for example, be a wired, or wireless Wide Area Network (WAN), such as a telephone network, a wired, or wireless Metropolitan area Network (MAN), a wired, or wireless Local Area Network (LAN) or even a wired, or wireless Personal Area Network (PAN).

Accordingly, terminal 102 can be any type of terminal configured to communicate over any of the above networks. In one particular embodiment that is discussed in detail below, terminal 102 can be any terminal configured to communicate over the Internet, such as a personal computer, laptop computer, Internet enabled phone, or handled computer, e.g., a Personal Digital Assistant (PDA) with communication capability.

Terminal 102 includes a standard input device 104 through which a token 106 can be interfaced with terminal 102. For purposes of this specification and the claims that follow, the term "standard input device" means a standard, or widely adopted device for inputting, or transferring information into a particular type of terminal 102. Thus, for example, if terminal 102 is a personal computer, then standard input device 104 can be a floppy drive, a Compact Disc (CD) drive, a CD Read/Write (R/W) drive, a Digital Video Disc (DVD) drive, or any other type of drive that is commonly included, or interfaced with a personal computer.

Token 106 is, therefore, a physical device, such as CD media or USB storage, that can be interfaced with terminal 102 through standard input device 104. Some specific token embodiments are described in detail below. Token 106 is configured to allow authentication authority 110 to verify the presence of token 106, through network 108, once it is interfaced with terminal 102 through standard input device 104.

An input device, the only purpose of which is to allow a token, such as token 106, to be interfaced with a terminal, such as terminal 102, to enable an online transaction is expressly not included in the definition of the term "standard input device." The point being that the systems and methods described herein do not require the cost, integration, or maintenance of specialized hardware in order to ensure a high level of authentication for online transactions. Rather, the systems and methods described herein allow the use of standard equipment to achieve high level authentication.

Thus, authentication authority 110 can be configured to verify the presence of token 106 if terminal 102 is engaged in a transaction that requires authentication. Authentication authority 110 can, depending on the embodiment, include or be interfaced with an authentication database 112 configured to store information related to a plurality of tokens 106. The information stored in authentication database 112 can then be used to authenticate transactions involving the plurality of tokens 106. For example, if token 106 comprises credit card information, then authentication database 112 can be configured to store valid credit card numbers. Authentication authority 110 can be configured to then verify both the presence of token 106 and the validity of a credit card number stored thereon.

Additionally, the person using terminal 102 can be required to provide a personal identifier, such as a PIN. In which case, information stored in authentication database 112 can also be used to verify the personal identifier provided. Thus, authentication authority 110 can be configured to supply two-factor authentication for electronic transactions involving terminal 102.

Verification of other factors can also be incorporated to provide even stronger multi-factor authentication. For example, if terminal 302 includes a biometric reader, such as a fingerprint sensor, then verification of a biometric can also be incorporated to provide multi-factor authentication. Further, other authentication techniques can be included such as digital signature techniques or other public key-private key techniques.

Before authentication authority 110 can authenticate a token 106, however, the personal identifier, e.g., PIN, should be "linked" with authentication information available in, for example, a database such as authentication database 112. The process of linking the personal identifier with the account information can be referred to as an enrollment process. Preferably, enrollment is seamless from the point of view of the user. In other words, enrollment should occur automatically, without requiring the user to affirmatively decide to enroll. And once the enrollment process starts, it should be quick, efficient and cause as little inconvenience as possible.

It should be pointed out that network 108 can be an unsecured network, e.g., the Internet, communications sent from terminal 102 to authentication authority 110 can be intercepted by an unintended party. Thus, from a security standpoint, it is preferable to encrypt communications between terminal 102 and authentication authority 110.

Figure 2:
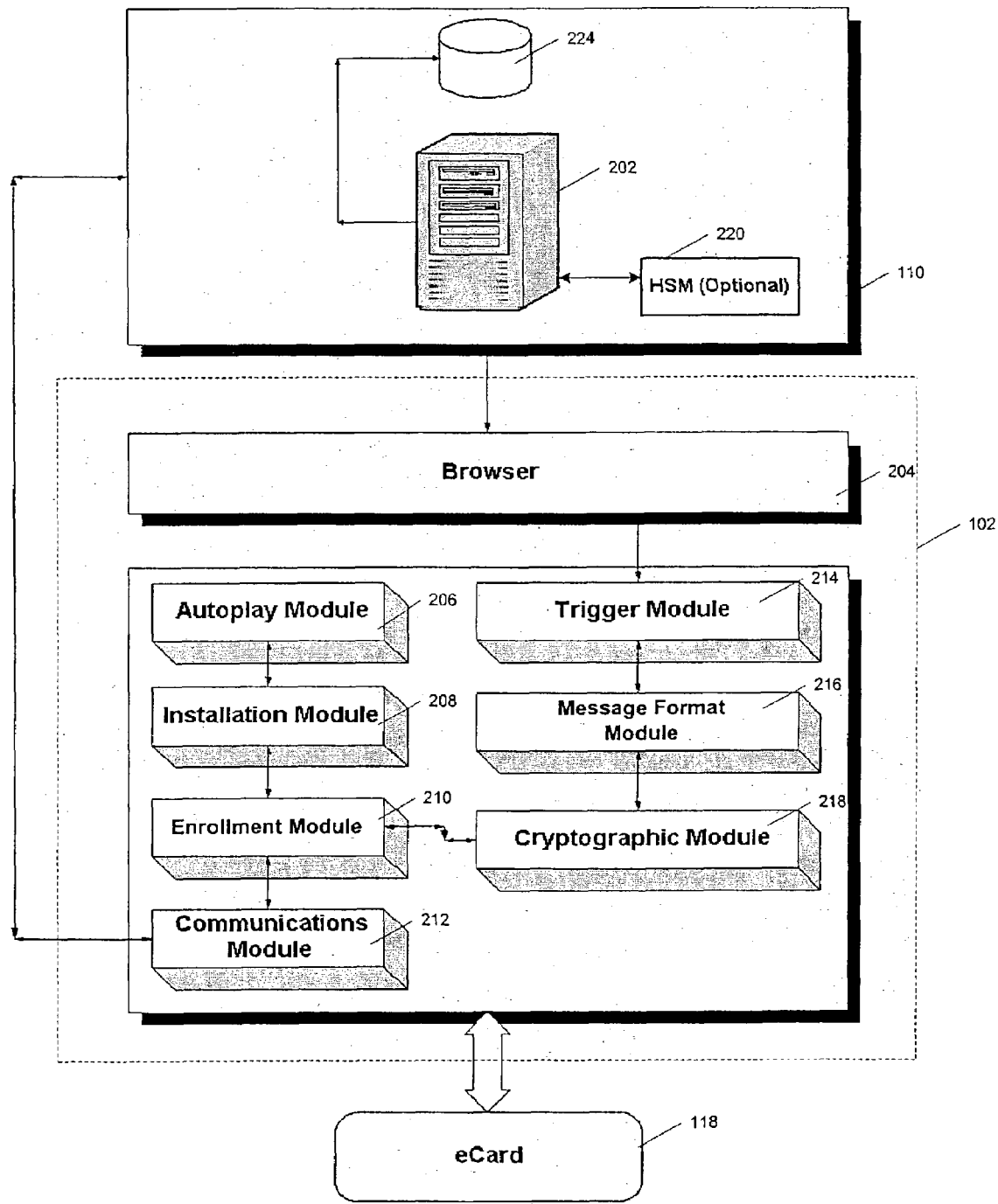
FIG. 2 is a diagram illustrating the online transaction system of FIG. 1 in more detail.

Distribution of tokens 106 can be handled, or initiated, by an issuing authority such as a bank can distribute token 106. For reasons described below, token 106 often is not associated with a user until enrollment takes place. When issued, token 106 can, as illustrated in FIG. 2, comprise client software 222, which can consist of software modules 206-218, and unique information such as: a unique serial number; a message key, e.g., a 192-bit Triple-DES user messaging key; random data, e.g., a 64-byte blob of unique, truly random alphanumeric data, a network address associated with authentication authority 110, e.g., a URL, and an issuer public key. The unique data can be used to link a token 106 to a user during enrollment. Further, after enrollment, the unique data can be used for authentication purposes.

Client software 222 can be configured such that correct execution of client software 222 depends on the presence of token 106 in terminal 102. This can be achieved for example, using authentication processes in which the unique information on every token 106 forms the basis for authentication. Thus, in the systems and methods described herein, authentication cannot take place if token 106 is not present in terminal 102.

In one specific implementation, client software 222 can also comprises Dynamic Link Libraries (DLL's), such as Active-X DLL's, which can be registered with terminal 102 during installation. The DLL's, together with the unique data, can then provide the functionality to authenticate users.

As mentioned, some or all of these modules can be loaded onto terminal 106. Terminal 106 can also include a browser application 204, which can be configured to act as a mediator between authentication authority 110 and software modules 206-212. For example, messages intended for software modules 206-212 can be received by browser application 204 from authentication authority 110 and transported, e.g., via JavaScript, to the appropriate software module 206-212. Responses from software modules 206-212 can then be sent to authentication authority 110 via browser application 204. For example, browser application 204 can be configured to insert the responses into Hyper Text Markup Language (HTML) pages that are then transmitted back to authentication authority 110 via a Hyper Text Transfer Protocol (HTTP) request, such as a POST request.

The ability to use a browser application 204, such as a web browser application, allows the systems and methods described herein to integrate seamlessly into conventional online transaction systems. For example, in most conventional online transaction systems, authentication authority 110 implements web-based logon using a browser application and all transmissions between authentication authority 110 and terminals 106 are web-based. It should be noted that in certain embodiments, enrollment is not web based. Thus, as described below, the systems and methods described herein allow for non-web based enrollment.

Authentication authority 110 can comprise a login server 202 that can be responsible for handling logon requests from different terminals 106. The authentication information described above can be stored as user profiles in user profile database 224, which can be located within a Hardware Security Module (HSM) 220. HSM 220 can actually be part of login server 202 or it can be separate as illustrated in the example embodiment of FIG. 2. As described in more detail below, user profile database 224 can be configured to store user key values and, after enrollment, information necessary to authenticate a user. User profile database 224 can be part of login server 202 or it can be standalone as illustrated in the example embodiment of FIG. 2.

Example implementations of modules 206-212 are now described for purposes of illustration.

Autoplay module 206 can, for example, be configured to initiate installation of client software 222 onto terminal 102. For ease of use, it is preferable if the installation process is automated, i.e., does not require user intervention to begin the installation process. A common example of an automated installation process is the process that occurs when a CD is placed into a computer's CD drive. On the typical personal computer, the computer's operating system automatically searches CDs inserted into the CD drive for an autoplay file, which is a "pointer" to an installation program on the CD. Thus, autoplay module 206 can be configured so that it is automatically executed every time token 106 is inserted into terminal 102. This assumes that such an auto play option is enabled within the operating system of terminal 102. Alternatively, the user can be required, or have the option, of manually activating autoplay module 206.

As described above, autoplay module 206 can be configured to point to another program that is configured to handle the installation process. In the example embodiment of FIG. 2, the program pointed to by autoplay module 206 is installation module 208. Installation module 208 can, for example, be configured to install client software 222 and register DLL's included therewith on terminal 102. Registration of DLL's can provide a link between the DLL name and its actual location.

In one particular embodiment, installation module 208 first checks for existing installations. If no existing installations are detected, installation module 208 starts a new installation. If an existing installation is detected, installation module 208 can be configured, for example, to check if the existing installation corresponds to token 106. For example, to accommodate for the situation in which multiple users are using the same terminal 102 to engage in online transactions each using a different token 106, installation module 208 can be configured to perform a unique installation process for each token 106. Thus, for example, the components installed and/or registered with each installation can be identified by token 106, e.g., using a unique serial number stored on each token 106. Therefore, installation module 208 can be configured to register DLL's and install client software modules 206-218 and associate them with a unique token serial number. If an existing installation is detected and the DLL's and client software modules 206-218 share the same serial number as the ones stored on token 106, then installation module 208 can be configured to forgo reinstalling the DLL's and client software 222.

Installation module 208 can be further configured to check if the drive, or interface identification associated with the existing registration matches the drive, or interface presently associated with token 106. If the installation and drive match, then there is no need to reinstall client software 222. Further, newer tokens 106, for example, can comprise updated versions of the DLL's and/or client software modules 206-218. Therefore, installation module 208 can also be configured to detect the version of any previously installed DLL's and/or client software modules. Installation module 208 can be configured to then forgo installation of any DLL's or client software modules that are the same version as those already installed.

Installation module 208 can also be configured to determine if token 106 has been enrolled with authentication authority 110. Thus, when the user first interfaces token 106 with terminal 102, installation module 208 can detect if token 106 is enrolled in an authentication program used by authentication authority 110. If enrollment is required, installation module 206 can be configured to call enrollment module 210 to handle the enrollment process. Installation module 208 can also be configured to prompt the user as to whether they want to enroll their token. The user can choose to skip the enrollment process if, for example, they have already enrolled, possibly using another terminal 102. An example enrollment process is described in detail below.

Enrollment module 210 can, for example, be configured to interact with logon server 202 via communications module 212. Enrollment module 210 can collect the unique information stored on token 106, e.g., a unique serial number, unique data, and a 192-bit message key, etc. and transmit it to logon server 202. In certain embodiments, enrollment module 210 is only active once, when the user enrolls. Subsequent installations of client software 222 should not require enrollment, because the user information is already captured.

Communications module 212 can be configured to interface with logon server 202 so that enrollment information can be exchanged with logon server 202. Thus, in one embodiment, communications module 212 can, for example, be Hyper Text Transfer Protocol/Secure (HTTP/S)-based and can, for example, be responsible for: establishing a connection to the correct logon server 202, e.g., using the network address, or URL, stored on token 106, transmitting enrollment information to logon server 202, and interfacing enrollment module 210 with logon server 202.

It should be noted that, depending on the embodiment, browser application 204 can be used to communicate with logon server 202 during authentication, while, as illustrated in the example of FIG. 2, communications module 212 can be used for enrollment. Alternatively, browser application 204 can also be used for enrollment. But using communications module 212 for enrollment instead of browser application 204 can ensure that logon server 202 is valid before enrollment information is sent. Thus, from a security standpoint, using communications module 212 for enrollment is preferred.

In one embodiment, trigger module 214 can be passed to terminal 102 from authentication authority 110 and can be configured as the calling function, or "trigger", that evokes autoplay module 206. In one specific implementation, trigger module 214 can be present within browser application 204, e.g., as a JavaScript that is passed down from the logon server 202 with specific initialization parameters.

Trigger module 214 acts as a mediator between logon server 202, browser application 204, and client software 222. Trigger module 214 can be configured to receive responses from client software 222 and then, for example, force a POST of the responses within browser application 204 to logon server 202. Trigger module 214 can also, for example, be configured to initiate message format module 216 whenever it posts messages to logon server 202.

Message format module 216 can form the main control loop for client software 222. Message format module 216 can be configured to initiate cryptographic module 218 and check responses therefrom. Message format module 216 can also be configured to execute cryptogram extraction on messages received from authentication authority 110. Message format module 216 can also be configured to format responses so that they can be interpreted by logon server 202 and to perform a first-run test to ensure that messages are valid, so that no additional action is taken if they are not.

Cryptographic module 218 can be configured as the security core of client software 222. As described below, authentication of token 106 can require a cryptogram to be generated. Thus, cryptographic module 218 can be configured to perform this task. A specialized security library (not shown) of cryptographic functions can be included on token 106, and installed on terminal 102 depending on the embodiment. Cryptographic module 218 can be configured to rely on the security library (not shown) to perform cryptogram generation.

Some example processes that Cryptographic module 218 can be responsible for include: importing message keys from token 106, mediating access to cryptographic objects via a secure kernel, performing encryption, performing decryption, performing key derivation from a user password, creation of cryptograms, overall security features, including memory page locking, object access control, attribute encryption, and data enveloping, to name just a few.

Figure 3:
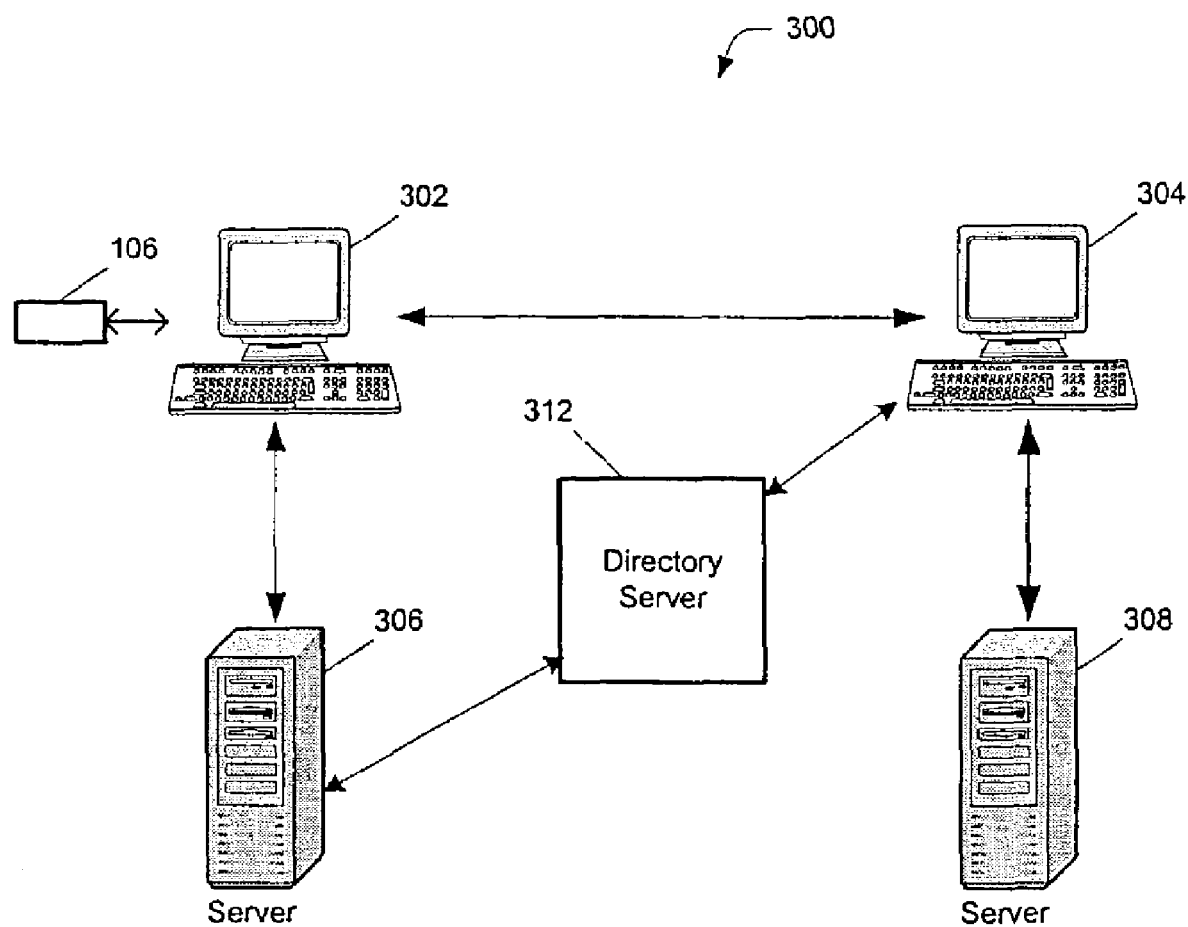
FIG. 3 is a diagram illustrating an exemplary electronic commerce system configured in accordance with an example embodiment of the invention.

FIG. 3 illustrates an exemplary online transaction system in more detail. Example enrollment and authentication methods will be explained in connection with system 300. System 300 comprises a merchant server 304 interface with a user terminal 302. System 300 also comprises an issuer authority 306, a directory 312, and a acquirer authority 308.

For purposes of explanation, it is assumed that terminal 302 is a computer, e.g., a desktop or laptop computer. Terminal 302 comprises a standard input device for interfacing with a token 106 as described above. Thus, a user can use their terminal 302 to go online and browse items offered by a merchant through merchant server 304. Often, therefore, merchant server 304 will be a web server configured to display web pages that present a merchant's offerings to users who access merchant server 304 using a web browser installed on their terminal 302.

Once the user selects an item to purchase, they normally supply some type of charge account information through their browser to merchant server 304 to make the purchase. For purposes of this specification and the claims that follow, the term "charge account" can mean any type of account against which charges can be posted. Thus, for example, it can be a credit account or a bank account.

Often, the transaction described above is completed by providing an account number that corresponds to a card, or token that is issued in relation to the charge account being used for the purchase. For example, the user can be issued a credit card in association with a credit account. Thus, the user can supply the credit card number to merchant server 304. More generically, however, it can be said that the user supplies a token identifier, i.e., some identifier or serial number associated with a token issued to the user, e.g., in connection with a charge account used by the user to make a purchase.

The term "token" is used to indicate that the systems and methods described herein are not limited to credit cards, or any other type of cards. Rather, the systems and methods described herein can be used with a variety of physical devices that are configured to store charge account, or other, information used in online transactions. Any of these various physical devices can be described as a token. Some specific types of token are described in detail below, but for purposes of illustration it can be assumed that token 106 can be read by a CD drive. Thus, in the example of FIG. 3, all the user has to do to is insert their token 106 into the CD drive of their computer 302.

Issuer authority 306 can be the institution that issued token 106 to the user. Accordingly, issuer authority 306 can comprise a server and can comprises, or have access to, information related to token 106 and to the user account associated with token 106.

Acquirer authority 308 is associated with the merchant of merchant server 304. Acquirer authority 308 is responsible for handling some of the overhead involved with charge account transactions handled by the merchant.

In a conventional online transaction, merchant server 304 must attempt to verify the authenticity of the token identifier supplied by the user. Under some of the new authentication mandates, merchant server 304 can query a directory 312 to verify the participation of the token issuer in one of the new authentication programs that comply with the new authentication mandates. Directory 312 can, therefore, be configured to store information related to tokens 106 issued by issuers. For example, for the situation were the tokens 106 are credit cards or the like, directory 312 can be associated with a credit card association. Each issuer authority 306 can then be configured to update directory 312 with information about issued tokens 106.

Thus, when merchant server 304 queries directory 312, directory 312 can be configured to determine whether the token identifier is in a participating identifier range, i.e., is associated with an issuer authority that is participating in the authentication program. If the token is in a participating range, then directory 312 can be configured to query the appropriate issuer authority 306 to validate the token and send a response back to merchant server 304.

Once merchant server 304 receives a response from directory 312, it can be configured to send an authentication request to issuer authority 306, i.e., issuer authority 306 can be configured to act as an authentication authority 110. The authentication request, can be directed to issuer authority 306 via terminal 302, e.g., via browser 204 running on terminal 302. Issuer authority 306 can be configured to then query terminal 302 for a password, or some other form of personal identifier. The user can then enter the password and terminal 302 can transmit it to issuer authority 306, which can be configured to verify the password.

Issuer authority 306 can be configured to then transmit an authentication response to merchant server 304, for example, through the user's browser 204. Merchant server 304 can receive and validate the authentication response. If authentication was successful, then merchant server 304 can be configured to transmit certain data to acquirer authority 308 and complete the transaction.

As can be seen, the new mandates provide stronger authentication for online transactions through the verification of an additional factor, namely a password; however, it is generally understood that a password, used in the way described, provides very weak authentication because passwords are easily accessed or "cracked". Further, the online security of passwords is weak, because a server on which they are stored can be "hacked" into or they can be intercepted as they pass from device to device. Thus, while the new mandates supply better authentication than before, they still do not approach that of off-line transaction, where strong two-factor authentication can be achieved.

To overcome these and other issues and to strengthen the authentication for online transactions, the systems and methods described herein provide the means to achieve strong multi-factor authentication with a high level of security. First, however, an example enrollment process is described, because a token 106 should first be enrolled before it can authenticated.

As mentioned above, in order to obtain the strong multi-factor authentication using a personal identifier, the personal identifier must be linked with token 106. For example, if token 106 is a charge card capable of being interfaced with a computer 302 and the personal identifier is a PIN, then the PIN should be linked with the charge card account information stored on, or interfaced with, issuer authority 306. If the PIN is linked with the charge card account, then issuer authority 306 can, for example, verify the PIN in conjunction with verifying the presence of token 106. This allows issuer authority 306 to authorize online transactions using strong two-factor authentication.

Figure 4:
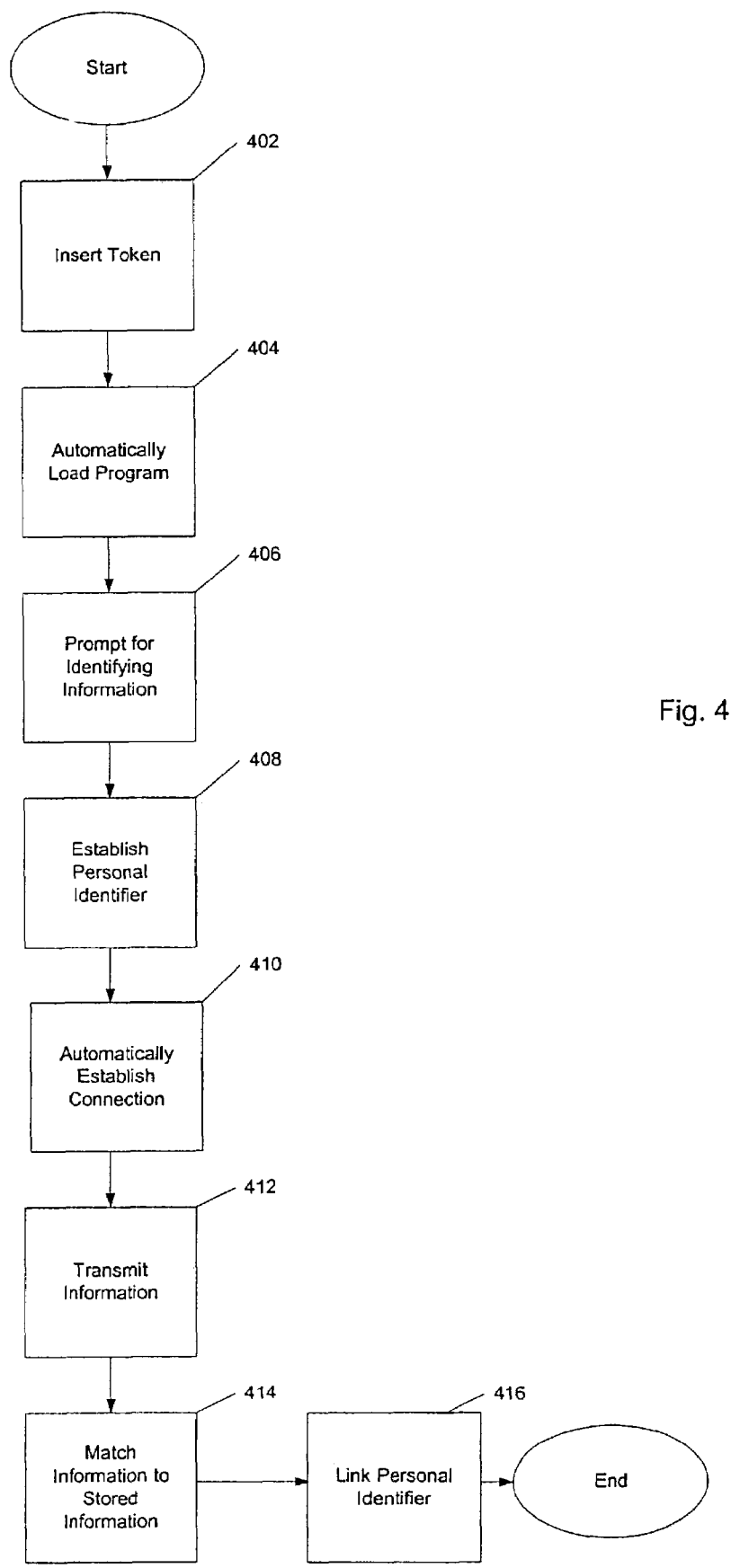
FIG. 4 is a flow chart illustrating a method for enrolling a token used in the system of FIG. 3 in accordance with an example embodiment of the invention.

FIG. 4 illustrates an exemplary method for implementing online enrollment in accordance with the systems and methods described herein. It is assumed that issuer authority 306 will act as the enrollment authority; however, a separate, or third party enrollment authority can also be used. First, in step 402 a user inserts a token 106 into a standard input device interfaced with terminal 302. This could be, for example, the first time a user attempts to use token 106 in an online transaction. In step 404, token 106 can be configured to automatically load client software 222 onto terminal 302, as described above.

In step 406, the user can be prompted to enter identifying information. For example, the user can be prompted to enter their banking or account information so that issuer authority 302 can verify the identity of the user. Thus, the identifying information can include name, address, account number (or token identifier), expiration date, mother's maiden name, identity number, etc.

In step 408, the user can establish a personal identifier that will be shared with issuer authority 306 and linked with the account information. This is described in more detail below.

Client software 322 can be configured to automatically establish a connection with issuer authority 306, in step 410, using, for example, a URL stored on token 106, and then automatically transmit the personal identifier, identifying information, and depending on the embodiment, a unique information stored on token 106 to issuer authority 306, in step 412.

In step 414, issuer authority 306 matches the identifying information against information stored in a profile associated with the user's account stored on, or interfaced with, issuer authority 306, e.g., in a user profile database 224. If the identifying information matches the stored information, issuer authority 306 can be configured to link the personal identifier, and possibly some or all of the identifying information and unique information, with the profile in step 416. The personal identifier can then be used to authenticate an online transaction engaged in using token 106. And because the personal identifier has been linked with the account profile, strong multi-factor authentication can be achieved.

Thus, by combining the enrollment methods just described with the authentication methods described herein, strong multi-factor authentication as well compliance with new authentication mandates can be achieved. Moreover, the multi-factor authentication and compliance with the new mandates can be achieved with zero adoption dependencies. In other words, no new hardware is required, nor does the user need to be educated on new software or hardware. Accordingly, the systems and methods described herein are easy to use, easy to adopt, and easy to deploy. In fact, a token issuer can, for example, simply mail out tokens 106 without fear they will be lost or stolen, since the tokens 106 are useless, i.e., not associated with an account, until the enrollment process is complete. Further, because the user needs to supply the identifying information, it is very unlikely that someone other than the intended user will be able to complete the enrollment process. Once the user gets an issued token 106, they are ready to start using it because enrollment will automatically be taken care of the first time they attempt to use their token 106, and all the user needs to do is simply follow the prompts displayed on their terminal 302.

Not only does the issuer no longer need to worry that an issued token will be stolen or lost in the mail, there is also no longer any need to send a password or PIN, i.e., a personal identifier, to the user. This is because the user can create their personal identifier during enrollment. Therefore, the issuer also does not need to worry about the user's personal identifier ending up in the wrong hands. As a result, issuance is made simpler, less risky, and less burdensome for both the issuer and the user.

Because client software 222 stored on token 106 can be configured to automatically establish a connection with the enrollment authority, the problem of spoofing is also eliminated. Spoofing is when someone creates a web page intended to look like another web page, such as an issuer's enrollment web page. The spoofer tricks a user, for example, into visiting their fake web page thinking it is the real web page. In this scenario, someone could spoof an issuer's enrollment page and then send an email to a user containing a link to the spoofed page. The email may ask the user to click on the link and then, once connected to the spoofed page, provide their personal identifier, account information, identifying information, etc., for enrollment purpose. But once the information is entered, the spoofer has all the information they need to fraudulently access and use the user's account. By implementing the systems and methods described herein, however, the user never has to click on a link and, therefore, spoofing can be prevented.

Figure 5:
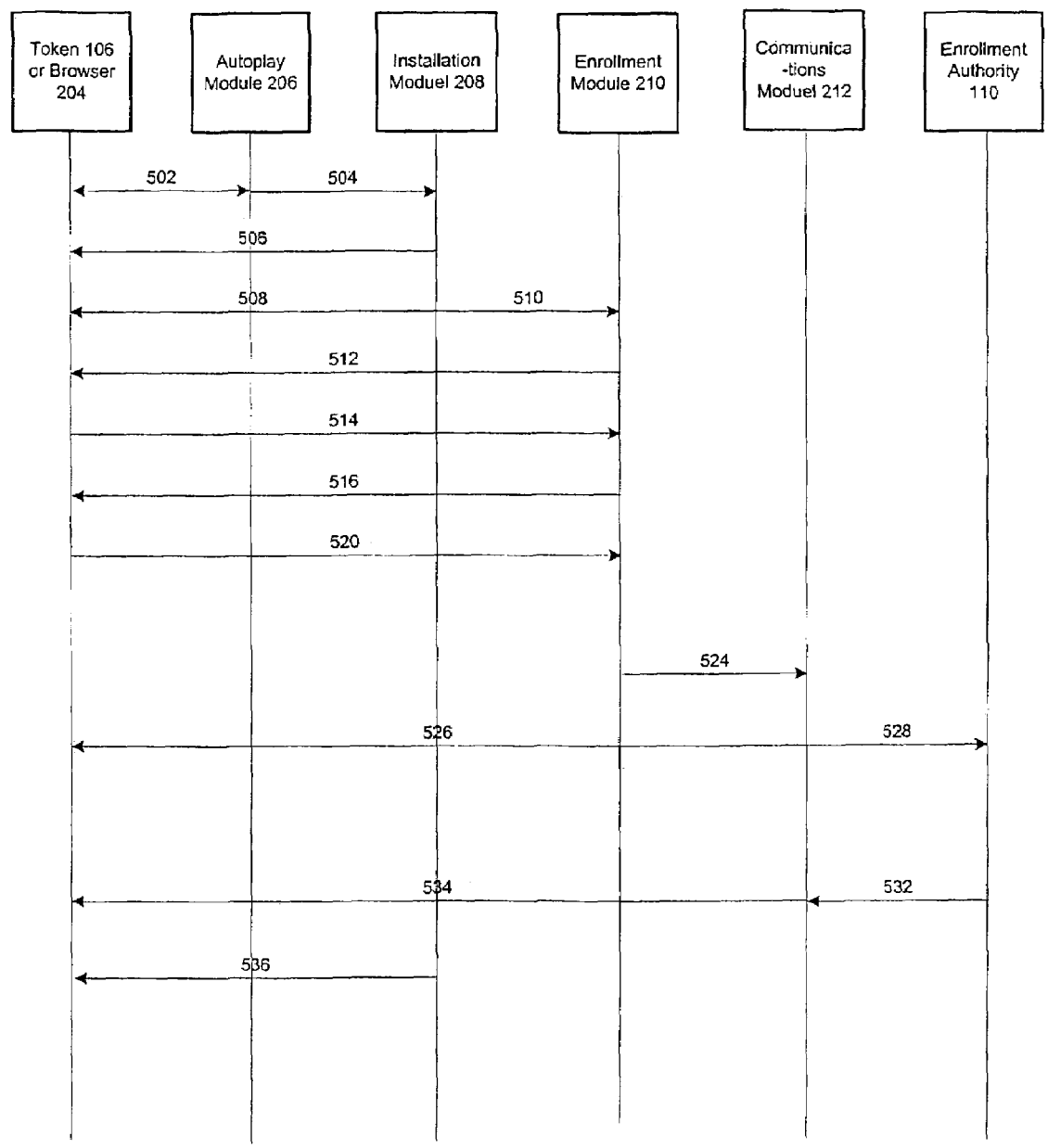
FIG. 5 is a flow chart illustrating a more detailed embodiment of the method illustrated in FIG. 4.

FIG. 5 is a flow chart illustrates a specific implementation of an enrollment process using software modules 206-218. The flow chart of FIG. 5 illustrates the interaction between the various software modules 206-218 as they execute the example steps involved in the enrollment process. It is also assumed that issuer authority 306 is acting as the enrollment authority.

First, in step 502, a user interfaces their token 106 with their terminal 302, which can for example invoke autoplay module 206, i.e. autoplay module 206 can be activated by the operating system of terminal 302. If the user does not have the option of auto play enabled, then token 106 can comprise a software program configured to display instructions to the user asking them to run a setup program stored on token 106. Such setup programs are often named setup.exe and are often stored on the root directory of token 106. If the auto play option is enabled, then autoplay module 206 can be configured to automatically run such a setup.exe file stored on token 106.

In one implementation, if a problem is experienced installing client software 222, then the operating system can report that installation failed, e.g., that the setup.exe file could not be executed. Instructions stored on token 106 can then be displayed to inform the user of the appropriate procedure that should be followed in such a situation. Alternatively, autoplay module 206 can be configured to report installation failure if it was the calling mechanism for the setup.exe file.

Next, in step 504, autoplay module 206, or the setup.exe program, can call installation module 208. In one example implementation, installation module 208, after it has been called in step 504, begins, in step 506, by checking the registry of terminal 302 to determine if there are any current installations of client software 222. As explained above, this can comprise checking to see if any current installations share the same serial number as that associated with token 106. This step can also comprise checking component versions, to ensure that the component versions associated with token 106 match the versions of any current installations.

Thus, in one implementation, there can be two results in step 506: installation module 208 can determine that client software 222 is installed and that the serial number, versions, etc. are the same, or that client software 222 is not installed, or is installed but the serial numbers, versions, etc. do not match. If the later is true, then installation module 208 can be configured to register the DLL's and install client software modules 206-218 included with token 106. Registering the DLL's can comprise forming a registry link between the name and CLS-ID of a DLL and the physical path to the DLL. In a Microsoft windows based operating system, for example, installation module 208 can be configured to call regsrv32, which can then perform the DLL registration.

Installation module 208 can be configured to then make a registry entry on terminal 302, using a serial number associated with token 106. For security, the serial number can be encrypted.

Thus, the installation can result in a successful registration or an error. If installation results in an error, installation function 208 can be configured to prompt the user to retry or cancel the operation. If the user wants to retry, then the installation procedure can be repeated. If the user decides to cancel, then the process can, for example, jump to step 536, which is described in detail below. If on the other hand, the installation was successful, then installation module 208 can be configured to determine if token 106 has been enrolled with issuer authority 306 in step 508.

In one example embodiment, if token 106 is already enrolled, then a value can be set in the registry of terminal 302 indicating that such is the case. For example, the value can be generated based on a scrambled version of the serial number associated with token 106. In certain implementations, the user can indicate that he does not wish to be asked to enroll. If the user has so indicated, then the value stored in the registry can, for example, indicate that such is the case. Thus, in step 508, depending on the implementation, installation module 208 can determine, e.g., based on a registry value, that token 106 is enrolled, that it is not enrolled, or that the user does not wish to enroll their token 106.

If installation module 208 determines that token 106 is enrolled, then the process can jump to step 534, which is explained in detail below. If the user does not wish to enroll, then the process can jump to step 536. If, on the other hand, installation module 208 determines that token 106 is not enrolled, then installation module 208 can be configured to prompt the user to enroll their token 106.

If the user chooses to enroll their token 106, then installation module 208 can be configured to call enrollment module 210, in step 510, at which point, enrollment module 210 takes over. In one specific implementation, enrollment module 210 prompts the user to enter their identifying information, e.g., banking details, in step 512, so that an account can be linked to token 106 and the user. In step 514, the user can enter their identifying information and enrollment module 210 can be configured to ensure that the identifying information provided is in the correct format. The format can, for example, be issuer specific. If enrollment module 210 determines that the details are not in the correct format, then the user can be prompted to re-enter them.

The user can cancel the process either when initially prompted to enter their identifying information or if they are prompted to re-enter it. In which case, the process can jump to step 536.

As explained in more detail below, a session key, such as a 192-bit Triple-DES session key, can be generated at this point. The session key can then be used for encryption in the following steps.

Next, the user can be asked to create a personal identifier that will be associated with their account and token 106, and that will be used later on to authenticate online transactions using token 106. In this example, the personal identifier is a PIN; however, it will be understood that the personal identifier can take a variety of forms. In step 516, enrollment module 210 creates a PIN entry screen that is displayed to the user.

Figure 6:
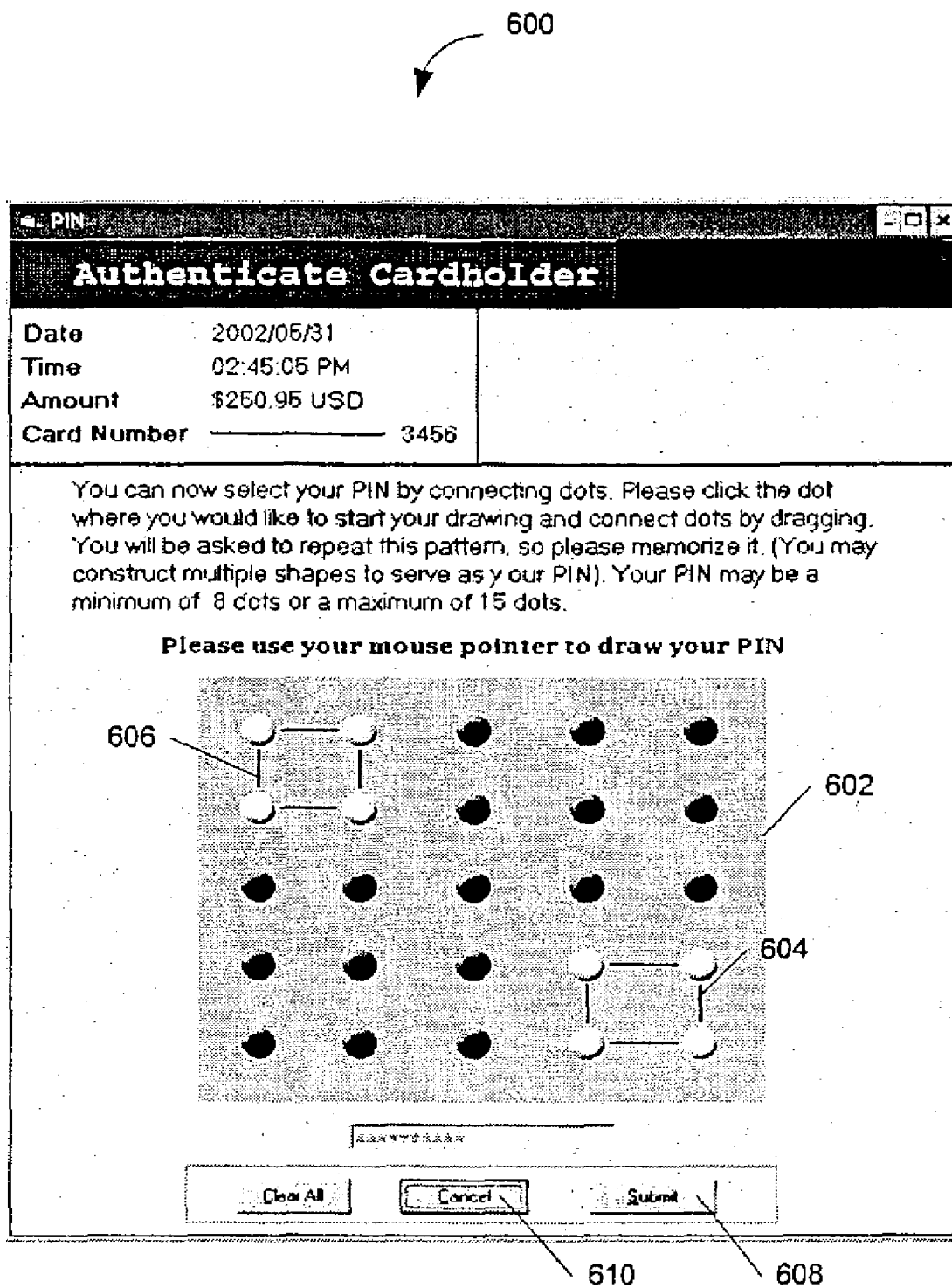
FIG. 6 is a diagram illustrating an example PIN construction screen that can be displayed on a terminal included in the system of FIG. 3 during the process illustrated in FIG. 5.

The PIN entry screen can be used by the user to construct their PIN in step 520. An example PIN entry screen 600 configured to allow the user to generate a graphical PIN is illustrated in FIG. 6. PIN entry screen 600 comprises a field of dots 602 that the user can "click" on to construct a graphical PIN. For example, once PIN entry screen 600 is displayed, the user can be prompted to click on the dots to generate a pattern. In the example of FIG. 6, the user has created a pattern consisting of squares 604 and 606.

Figure 7:
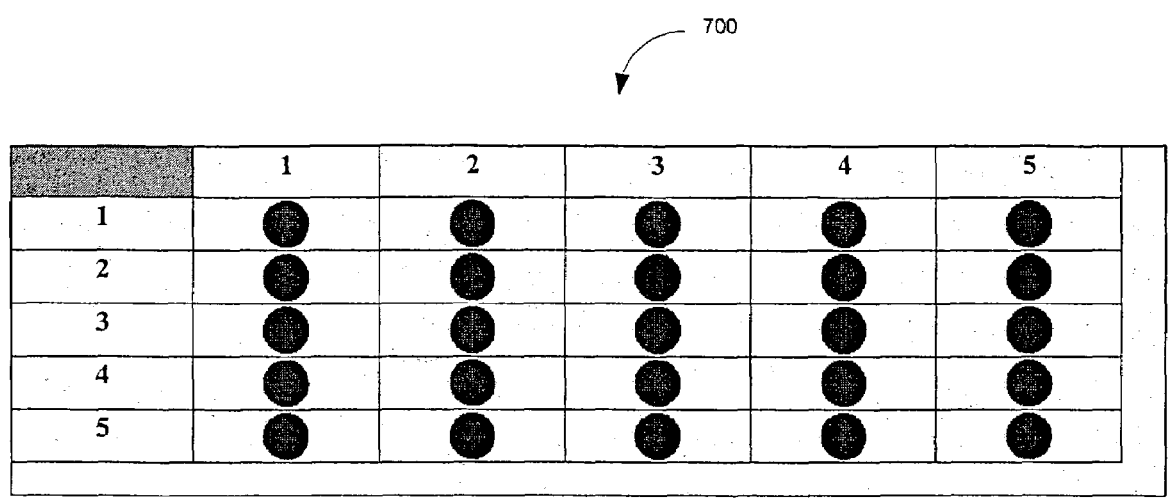
FIG. 7 is a diagram illustrating an exemplary mapping scheme that can be used in conjunction with the PIN construction screen of FIG. 6.

Each dot in field 602 can be mapped to a co-ordinate value as illustrated by table 700 in FIG. 7. Thus, the pattern of FIG. 6 maps to the following co-ordinates: (1,1)(2,1)(2,2)(1,2)(4,4)(5,4)(5,5)(4,5). With every click, the co-ordinates can be mapped and encrypted with the session key mentioned above.

Once the user has generated a graphical PIN, he can attempt to submit it by, for example, clicking on the submit button 608. Enrollment module 210 can be configured to then validated the PIN based on certain criteria, such as length. The criteria can, for example, be based on criteria promulgated by the issuer of token 106. If validation fails, the user can retry the operation. Alternatively, the user can, for example, click on cancel button 610 to end the process. If cancel button 610 is clicked, then the process can jump to step 536. In which case, terminal 302 memory can be cleared of all account information previously entered.

It should be noted that the systems and methods described herein are not limited to the use of graphical PINs or to PINs in general. Thus, other personal identifiers and personal identifier creation techniques can also be used.

If the PIN entered in step 520 is validated, then enrollment module 210 can be configured to prepare a "enrollment form". The enrollment form can, for example, comprise the PIN co-ordinates, a token serial number, random data stored on token 106, and a message key. Communications module 612 can then be invoked, in step 524, in order to transmit the enrollment form to the enrollment authority, which can be issuer authority 306. But first, the enrollment form information can be encrypted for security. Encryption can comprise the following steps: first, all the enrollment form information is encrypted with the session key. In one implementation, a user account number and an account identifier are used to derive a 192-bit Triple-DES session key. This can, for example, be achieved by hashing the account identifier and the last four digits of the user account number into a 64-bit key and using three equal keys for Triple-DES encryption. The token serial number, random data, message key, and PIN co-ordinates can then be concatenated and encrypted with the three equal keys to form a cipher.

In step 526, a network address, in this case a URL, is obtained from token 106. The URL can, for example, comprise the following format: http://www.someacs.com/RegistereCard.asp?AccNum=123456789012345&Info=anmdsa#@!#d sjkajdlskajdksla. As can be seen, two parameters are included in the query string of this example URL. The first is the user account number and the second is the cipher that was described above. Communications module 212 can be configured to use the URL constructed above to establish a connection with issuer authority 306 and then transmit the enrollment information to issuer authority 306, in step 528. If this step fails, then the user can be prompted to retry. Alternatively, the process can simply jump to step 536 and exit, or the user may decide to end the enrollment process in response to the retry prompt, which can again can cause the process to jump to step 536.

If no errors occur during transmission, then issuer authority 306 can be configured to take over at this point. A connection with issuer authority 306 is established as described, so an active (secure) session is assumed to exist. The following steps are an overview of the processing that can take place on issuer authority 306, i.e., by the enrollment authority. Specific implementation details, however, will depend on the enrollment authority and/or on the particular issuer authority 306.

Issuer authority 306 can verify the account number and cipher. Assuming the account number and cipher are verified, then issuer authority 306 can determine whether the user has already enrolled. In one implementation, issuer authority 306 can not allow enrollment of a previously enrolled user, unless the user's token 106 has been lost or disabled. If issuer authority 306 determines that the user is already enrolled, and the user's token has not been lost or disabled, then issuer authority 306 can simply return a successful enrollment message in step 532.

If, on the other hand, issuer authority 306 determines that the user is not previously enrolled, then issuer authority 306 can be configured to verify the existence of an account corresponding to the account number provided in step 528. If the account number can be verified, then issuer authority 306 can extract the PIN information provided in step 528. If the information provide in step 528 is encrypted, then issuer authority 306 can derive the same session key as used to encrypt the information, e.g. concatenating the last 4 numbers of the account identifier and the account number. Then using the result to produce a 192-bit Triple-DES key comprising three equal 64-bit keys.

Once the session key has been derived, issuer authority 306 can attempt to decrypt the cipher. If the cipher can be decrypted, the enrollment information can, for example, be assumed valid. If the cipher cannot be decrypted, the enrollment information can be assumed invalid. Further, once the information is decrypted, issuer authority 306 can be in possession of the enrollment information, e.g., token serial number, random data, message key, and the PIN.

Issuer authority 306 can be configured to then determine if the enrollment information comprises the correct format. If the format is correct, then issuer authority 306 can be configured to store the enrollment information in a user profile. Finally, the PIN is linked with the user profile. When it is subsequently received from a terminal, issuer authority 306 can verify the identity of the user base don the PIN. In one implementation, the PIN is encrypted with the session key before it is stored in the user profile.

Next, the results of the enrollment process can be communicated to terminal 302. Thus, in step 532, communications module 212 can receive a response from issuer authority 306. Clearly, the enrollment can either be successful or unsuccessful. If enrollment was successful, then the user can be notified in step 534. If it was unsuccessful, then the user can be prompted to re-enter information or to start over. A unsuccessful registration can result for a variety of reasons, such as incorrect information supplied too issuer authority 306, a communications failure between terminal 302 and issuer authority 306, etc.

In step 536, execution of installation module 208 and autoplay module 206 is terminated and, assuming enrollment was successful, the user is ready to use their token 106 in online transactions. First, however, installation module 208 can be configured to delete all registration entries made on terminal 302 during the enrollment process. This is an added security feature. Because the registration entries are deleted, there is nothing stored on terminal 302 that can be accessed, e.g., by a "hacker", and used to fraudulently gain access to the user's account or account information.

An example authentication process will now be described. Preferably, authentication should provide verification of more than one factor so that strong multi-factor authentication is achieved. Thus, authentication preferably verifies that token 106 is present and that the user is who the user is supposed to be, i.e., the user to whom token 106 was issued. The latter factor can be achieved via a static password, as explained above, or using, for example, a certificate stored on token 106. The use of certificates for identification/authentication is well known and will not be discussed here. But as mentioned, these techniques do not necessarily offer the strong authentication required to reduce fraud. Thus, it is preferable if a personal identifier generated during enrollment and linked with the user's user profile, as described above, is used for authentication.

FIG. 8 is a flow chart illustrating an example authentication process according to one embodiment of the system and methods described herein. The process begins in step 802 when an authentication authority receives a request to authenticate an electronic transaction. For purposes of illustration, it will be assumed that the electronic transaction is an online transaction occurring in system 300. Thus, issuer authority 306 can act as the authentication authority and the authentication request can originate with merchant server 304.

Once issuer authority 306 receives the authentication request in step 802, it can send an authentication message to terminal 302 in step 804. The purpose of the authentication message is to illicit from terminal 302 information that can be used to authenticate the transaction. The information should allow issuer authority 306 to verify the presence of token 106 and the identity of the user. Thus, in step 806, terminal 302 can prompt the user to interface their token 106 with terminal 302. Once token 106 is interfaced with terminal 302, terminal 302 can extract information from token 106 that can be used to verify the presence of token 106. For example, certain unique information can be stored on token 106 that once validated by issuer authority 306 will verify that token 106 was present and interfaced with terminal 302.

In addition, the user should supply some form of personal identifier, such as a PIN, that has been linked with information stored on or interfaced with issuer authority 306 and that will allow issuer authority 306 to verify the identity of the user. Thus, in step 810, the user is prompted to supply the personal identifier.

The unique information and the personal identifier can then be sent to issuer authority 306; however, from a security standpoint, it is preferable if the information is encrypted before it is sent to issuer authority 306. Any conventional encryption technique or combination of techniques can be used for encryption, but in the embodiment of FIG. 8, a transactional unique session key is generated in step 812 and used to encrypt the information in step 814.

The term transactional unique means that a different session key is generated for every transaction entered into in system 300. Security can be enhanced by using a transactional unique session key to encrypt the information, because the transactionally unique session key is not stored anywhere that it can be accessed by the wrong party and then used to intercept and decode the authentication information. Generation of the session key and example encryption techniques are discussed more fully below.

The encrypted information is then sent to issuer authority 306 in step 816. Issuer authority can then decrypt the received information, using the session key, in step 818. Once the information is decrypted, it is validated in step 820 to verify that token 106 is present and that the user is who they say they are. If the verification is successful, then issuer authority 306 can authorize the transaction in step 822.

Figure 9A:
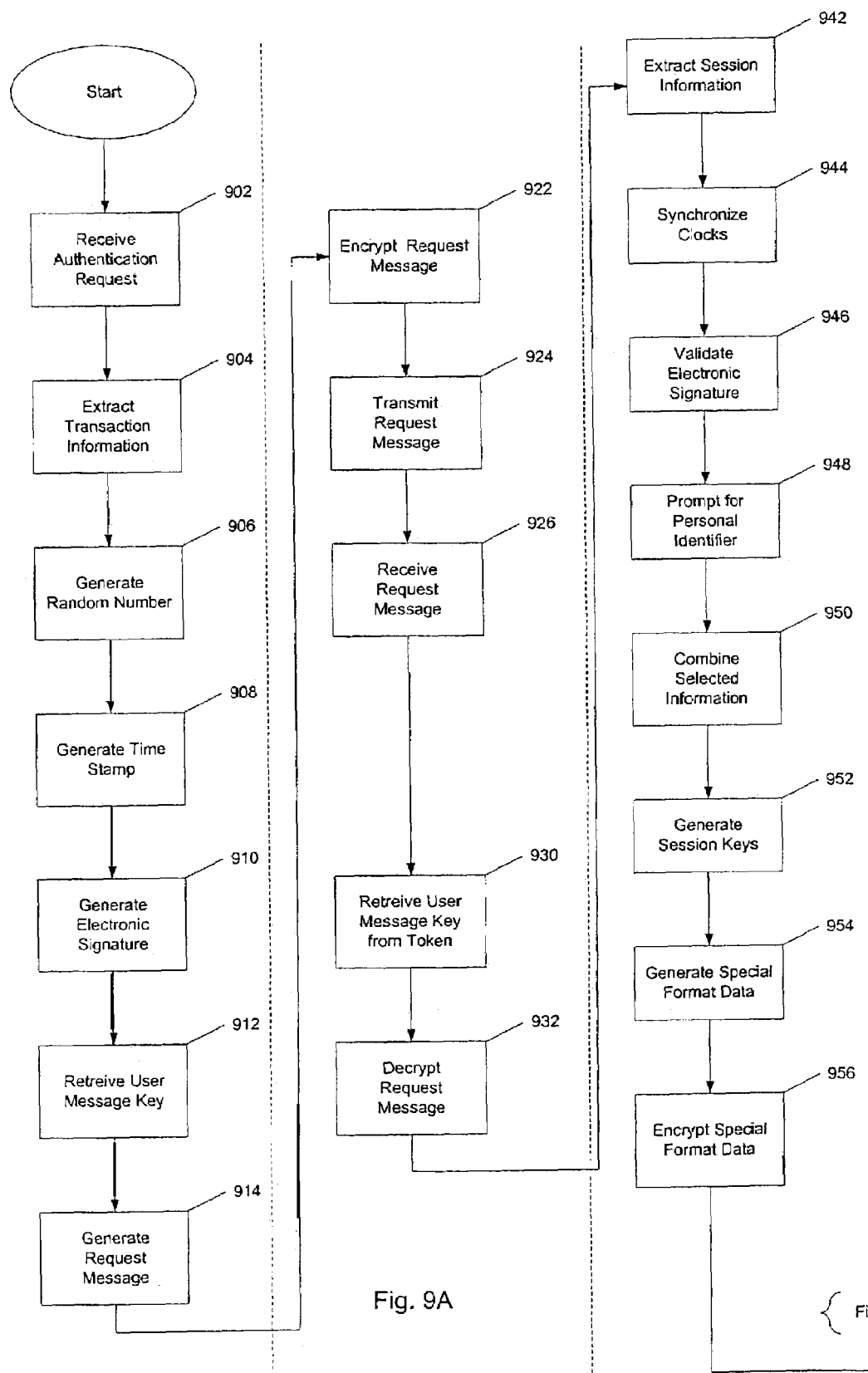
FIGS. 9A and 9B comprise a flow chart illustrating a more detailed embodiment of the method illustrated in FIG. 8.
Figure 9B:
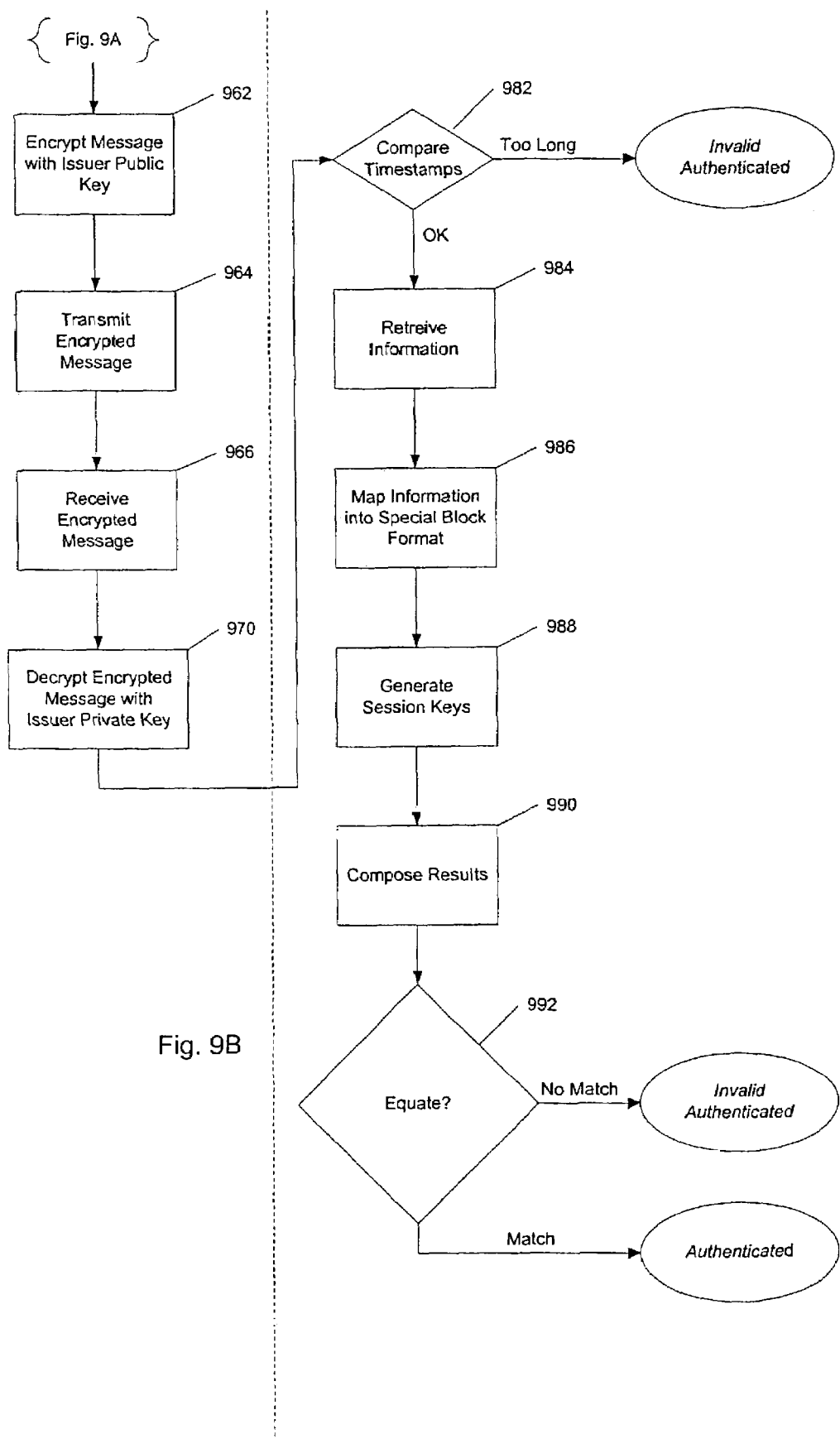

FIGS. 9A and 9B comprise a flow chart illustrating a specific implementation of secured multi-factor authentication in accordance with an example embodiment of the systems and methods described herein. The authentication process can be triggered when the authentication authority 306 receives a request message. This request messages preferably includes transaction information from the merchant. The authentication authority 306 then generates constructs a request message to solicit a cryptogram, i.e., a pre-determined encrypted combination of pieces of information, from the user terminal. The generation of this request message in this embodiment is described in steps 902-914. This request message is preferably transmitted over a secure communication channel, while this transmission can, for example, take place over the Internet, a WAN, or a LAN using a secure sockets layer (SSL), or over a Wireless LAN using Wired Equivalent Privacy (WEP), this embodiment adds protection by using encryption as described in steps 922-932. The user terminal upon receiving a valid request constructs a cryptogram which can be used to validate a plurality of factors, which is described for this embodiment in steps 942-956. The cryptogram is preferably transmitted over a secure communication channel. Once more, this preferred embodiment adds additional encryption, as described in steps 962-970, to what can be a channel already protected by SSL. The authenticating authority 306 verifies the various desired factors at the user terminal by validating the cryptogram, described in this embodiment in steps 982-992.

By coordinating the encryption/decryption process between the authentication authority 306 and terminal 302, secure, multi-factor authentication can be achieved that increases the level of authentication and that is easy to implement with very little overhead. Accordingly, fraud can be reduced significantly.

The example process of FIGS. 9A and 9B begins in step 902 with the authentication authority 306 receiving an authentication request. Authentication authority 306 can be configured to then extract, in step 904, certain information related to the transaction from the request. For example, in one particular implementation, authentication authority 306 can be configured to extract transaction information such as a purchase amount, the merchant's country code, a transaction currency code, and the transaction date.

Authentication authority 306 can, for example, generate a one time random, or pseudo random, number in step 906, which is used to cryptographically strengthen the authentication process by making it significantly more difficult for an eavesdropper to detect patterns in repeated transmissions. Authentication authority 306 can further strengthen the authentication process by generating a timestamp in step 908, which can be used to set a time limit on the authentication process, thereby reducing the exposure to potential attack.

In step 910, authenticating authority 306 can further extend trust in its credentials by generating an electronic signature. An example of this is to form a hash code by concatenating a collection of some or all of: transaction information, time stamp, random, or pseudo random, number, and applying a cryptographic hash, such as SHA-1 (Secure Hash Algorithm) or MD-5 (Message Digest Algorithm). This hash code is then encoded by using a public key decoder (using the authority's private key), yielding a signature.

In step 912, a message key can then be retrieved, for example, from a database within the authentication authority 306. In step 914, authentication authority 306 can then take the transaction information, time stamp, random, or pseudo random, number, and electronic signature and generate a plaintext request message. For example, in one particular implementation, the plaintext request message is first generated by combining, e.g., concatenating, the session information. It should be noted that for security purposes it is desirable for the session information to be ephemeral, that is relevant only for this transaction.

The plaintext request message is now ready to be transmitted to terminal 302 as a request for cryptogram. The plaintext request message is preferably transmitted over a secure communication channel. In one embodiment, therefore, the communication channel is the Internet, which can be secured by using a secure sockets layer (SSL). The process of FIGS. 9A and 9B can, however, also allow for further security steps.

By first encrypting the plaintext request message using the message key (retrieved in step 912) as illustrated in step 922. The plaintext request message can then be encrypted using the following algorithm:

$$O = E_k(I) \qquad \text{EQ. (1)}$$

where: k=the message key;
$E_k$=an encryption algorithm, such as a Triple-DES algorithm, using the message key, k;
I=the concatenated information; and
O=the output.

Authenticating authority 306 can now send the encrypted plaintext request message over the communication channel, as shown in step 924. In step 926, terminal 302 receives the encrypted plaintext request message. In order to decrypt the received message, a message key needs to be retrieved from token 106. Thus, for example, if token 106 is not interfaced with terminal 302, a prompt can be displayed to the user asking them to interface their token 106. Once token 106 is interfaced, the message key can be retrieved in step 930. It is preferable for the message key to reside on a removable medium such as token 106, so that the message key resides in terminal 302 only during the transaction process thereby limiting its exposure to potential hacker attack. In step 932, using the retrieved message key, the received request message can be decrypted.

It should be recalled from FIG. 8 that reception of the request message can act as a triggering action that causes terminal 302 to enroll token 106 if it is not already enrolled. Additionally, upon receiving the request message, terminal 302 can proceed to extract the session information in step 942.

In step 944, terminal 302 can, for example, use the extracted time stamp to synchronize its own session clock. The session clock does not, however, need to be the system clock of terminal 302. Rather, it can be a dedicated clock used for the purposes of authentication.

Preferably, the session information is additionally used to validate the integrity of authentication authority 306, e.g., validate the electronic signature, in step 946. This can comprise concatenated and cryptographically hashing the session information, as described in step 910. The resulting digital signature is then encoded with the public key, using a public key algorithm such as the Digital Signature Algorithm. Since the hash code was "pre-decoded" by the private key, encoding it yields the original hash code which can be compared to the one just generated. Since only the owner of the private key can decode a message, the validity of the sender, i.e., the authentication authority, is proven.

Next, in step 948, the user can be prompted to input a personal identifier, such as a PIN. In general, the personal identifier is some type of password or secret number that is associated with the user, but may include additional factors such as biometric parameters or a graphical PIN. It can also be a response to a cryptographic challenge if one were included among the session information, in effect, a digital signature. Association of the personal identifier with the user is explained with respect to enrollment.

The cryptogram can be formed by cryptographically combining, in step 950, selected information, such as the personal identifier described above, unique information extracted from token 106, and ephemeral session information described above. It should also be noted that the cryptogram should include at least one personal identifier to establish the presence of the person, and at least one unique element to establish the presence of the token. Further, it should be noted that both the unique information and the personal identifier tend to be persistent, secret, and shared between the user and authenticating authority 306.

Cryptographic module 218 can, for example, be configured to generate the combined cryptogram in such a way that it is difficult to synthesize another set of elements to yield the same cryptogram, so that it is difficult to retrieve any information about the elements, including full or partial retrieval of some or all of the constituent elements. Some example methods of cryptographic combination that can accomplish these goals, include: the concatenation of elements and encryption with a one-way cipher, i.e., a cipher for which encryption is easy, but decryption is not feasible; concatenation of elements with the application of a hash function, i.e., a function which transforms data into a representation, usually a shorter message that, again, is easy to encrypt, but hard to decrypt, and that is collision-free, i.e., not feasible to find another set of elements with the same representation; concatenation of elements with a symmetric cipher, i.e. a cipher using the same private key for encryption and decryption, where select shared elements can be used to generate keys; and concatenation of elements, a second hash function, and a symmetric cipher, and again the keys can be generated from select shared elements. The example embodiment of FIGS. 9A and 9B employs the latter.

In this embodiment, the time stamp, one-time random, or pseudo random, number, and personal identifier can be used to generate a symmetric session key, in step 952. For instance, the PBKDF1 (password based key derivation function), as described in the Public Key Cryptographic Standards #5 (PKCS #5), using the SHA-1 hash function can be used to generate three 64 bit keys. These three keys form the requisite 192 bit key used in DES-EDE or DES-EEE, two forms of the Triple-DES cipher. To clarify, a Triple-DES cipher incorporates three DES ciphers, each requiring a key; hence, each of the 64 bit component keys are used in each of the three internal DES ciphers.

In step 954, a hash function can form two strings. The first string concatenates select bits, or digits, from the PIN, the one-time random, or pseudo random, number, and the serial number of token 106, and additional unique information stored on token 106. The second string concatenates select bits from the one-time random number, the time stamp, and other unique information stored on token 106 but not used in the first string. These two strings are then combined using an exclusive-or (XOR) operation to result in a special format. The value of the hash function is that some information is not included in case the cryptogram is somehow compromised. In step 956, the resultant format data of step 954 is encrypt using the session key of step 992. For added security, an added timestamp can be generated and appended to the cryptogram.

Preferably, the decryption/encryption process of steps 942-956 is carried out in memory that is included in terminal 302. Another option is to carry out the process on token 106, but this increases the token resource requirements, because token 106 will need to comprise sufficient memory to carry out the process. This can be less desirable, because it can, for example, increase the cost and size of token 106.

Terminal 302 transmits securely to the authentication authority 306 in steps 962-970. Thus, in step 962, the cryptogram can be encrypted by enciphering the cryptogram with the issuer's, or authority's, public key using a public key cipher, such as DSA or Rivest-Shamir-Adelman (RSA), ensuring that only the authentication authority 306 can decipher the cryptogram. In step 964, the encrypted cryptogram is transmitted back to authentication authority 306. Again, this can be over the Internet and additionally can employ SSL. In step 966, authenticating authority 306 receives the encrypted cryptogram. Authentication authority 306 can then decipher the encrypted cryptogram with its private key in step 970.

Authentication authority 306 can be configured to then validate the cryptogram. This process can, for example, comprise stripping out the timestamp and comparing it to the original time stamp and the current time, as shown in step 982. If too much time has elapsed, the validation process has expired and authentication has failed. If time has not lapsed, then in step 984, the unique information and personal identifier can be retrieved as well as the session information.

Once these elements are retrieved, the cryptogram can be verified in a number of ways depending on the method of encoding. For example, if a one-way cipher was employed, the same elements used to generate it can be combined and enciphered. The result can be compared with the cryptogram.

The same method described above for validation can also be applied for other types cryptographic combination; however, some types of combinations have additional methods of validation. For instance, if a symmetric cipher was employed, the cryptogram can be decrypted and the elements extracted. Those elements can then be compared to the original elements. In the case were a hash function and a symmetric cipher is used, the relevant elements can be combined and hashed by the hash appropriate function, while the cryptogram is being deciphered. The result of both operations are two hash codes, the former derived from the authentication authority's information and the latter from the cryptogram, i.e., terminal 302.

In embodiment of FIGS. 9A and 9B, the same relevant elements can, in step 986, be mapped into the special format described in step 954. The same session keys can then be generated as in step 986. The cryptogram can be partially decrypted using the session key as shown in step 988. The special format results can be compared in step 990. If they equate in step 992, then the authentication is complete and the validation is established. If not, the validation failed. The result of the authentication can then be propagated to the rest of the transaction system.

A couple of general points should be carefully noted. First, using the authentication process described, strong two factor authentication is achieved, because the authentication authority has verified that the token was present, and that the user is who they say they are through use of the personal identifier.

Second, other factors such as a biometric can also be verified. For example, if terminal 302 comprises a biometric input such as a fingerprint sensor, then biometric information can be obtained and included in the cryptogram. Once the cryptogram is received, then authentication authority 306 can validate the biometric information. For instance, by decrypting the cryptogram, extracting the biometric information, and verifying it. This, of course, requires authentication authority 306 to have access to a stored reference of the biometric information. Thus, the number of authentication factors can be increased depending on the number and types of inputs available to terminal 302.

Third, a high level of security can be achieved due to the use of public key-private key technology, random number generation, and unique session key generation as described above. In fact, several layers of security can be implemented in the encryption/decryption process. Accordingly, fraud can be reduced to well within manageable levels using the systems and methods described.

Some example token embodiments will now be described. As explained above, a token 106 can be any type of media that can be interfaced with a terminal 102 through a standard input device 104. One such common input device is the CD drive, or CD R/W drive. Thus, in one embodiment, token 106 can be a CD media that can be interfaced with terminal 102 through a CD drive. In one specific embodiment, token 106 is actually a mini-CD such as mini-CD 1000 illustrated in FIG. 10. Mini-CDs are common and, therefore, the dimensions and properties will not be described here. One aspect, however, of mini-CD 1000 that can vary from implementation to implementation is the location of hole 1010. Hole 1010 allows mini-CD 1000 to be installed in a standard CD drive. Often, hole 1010 will be located in the middle of mini-CD 1000. It other embodiments and implementations, however, hole 1010 can be offset from center.

Mini-CD 1000 includes CD data on one side that is read by a CD drive. The data capacity can be for example 50 Megbytes (Mb). This is often much more than is needed to store the data required for enrollment and authentication as described above. The extra data capacity can be used, therefore, to store advertising information or to other information that can be displayed to the user on their terminal 102. In fact, this other information can include links to other network addresses or pages.

From a user point of view, it would be preferable to use token 106 for offline as well as online transactions. This reduces the number of tokens that a user must carry and keep track off. But this also means that token 106 needs to be able to fit in conventional credit card readers, for example. Unfortunately, a mini-CD is too thick to fit in conventional card readers. If mini-CD 1000 is made thinner, however, then it will not be readable by conventional CD drives.

Figure 11:
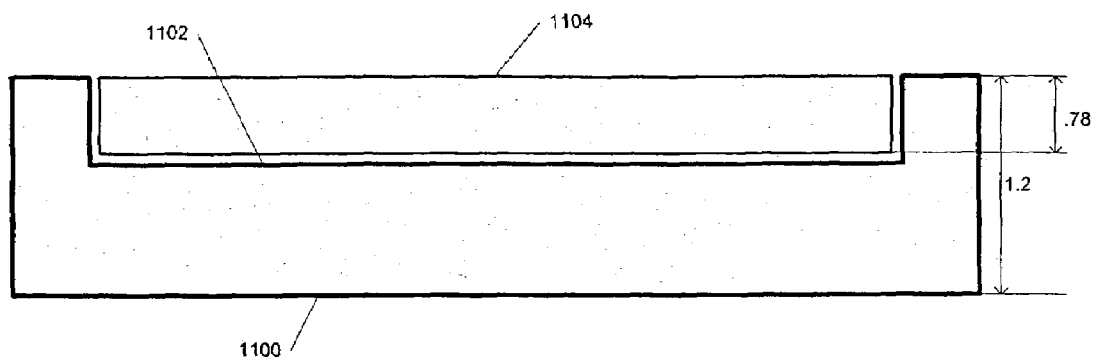
FIG. 11 is a diagram illustrating an example embodiment of a token configured in accordance with another embodiment of the invention.

In FIG. 11 an alternative embodiment of token 106 is illustrated that comprises a thin mini-CD 1104 that is capable of being read by conventional card readers. Thus, for example, thin mini-CD 1104 can be completely compatible with the ISO 7811 standard for plastic cards, e.g., credit cards. Thin mini-CD 1104 can, therefore, work in ATM machines, and conventional credit card readers.

In the example embodiment of FIG. 11, thin mini-CD 1104 is 0.78 millimeters (mm) thick. This is too thin, however, for thin mini-CD 1104 to be read by conventional CD drives. To remedy this, a carrier 1100 can be used to allow thin mini-CD 1104 to be read by conventional CD drives. Therefore, thin mini-CD 1104 can be placed in a cutout 1102 within carrier 1100 and then installed in a conventional CD drive. The combined thickness of carrier 1102 and thin mini-CD 1104 is returned to that required by a conventional CD drive, i.e., 1.2 mm.

The location of cutout 1102 can vary depending on the embodiment. For example, if hole 1010 included in thin mini-CD 1104 is in the center of thin mini-CD 1104, then cutout 1102 can be centered within carrier 1102. But, hole 1010 can be off-center. Therefore, cutout 1102 can be located as required.

In one implementation, hole 1010 in thin mini-CD 1104 can be off-center to accommodate a smart card chip. In other words, thin mini-CD 1104 can be configured to work in a smart card reader as well as a CD drive. In order to work properly, however, thin mini-CD 1104 must have a smart card chip just like a conventional smart card. If hole 1010 is centered, however, there may not be enough room to accommodate a smart card chip on thin mini-CD 1104. Therefore, hole 1010 can be placed off-center to allow enough room to accommodate a smart card chip.

In order to work in conventional card readers that are configured to read magnetic strips, thin mini-CD needs to have a magnetic strip. Thus, the position of hole 1010 can also be effected by the location of a magnetic strip included on thin mini-CD 1104.

Often, in the offline world, a users token or card is embossed with an account identifier, for example. The embossing is then used in card imprinting devices in certain situations. Thin mini-CD 1104, and mini-CD 1000 for that matter, cannot, however, be embossed. This is because embossing is achieved from the underside of the card or token. But in the case of thin mini-CD 1104, the CD readable data is on the underside. Therefore, embossing will destroy the data or the readability of the data.

Figure 12:
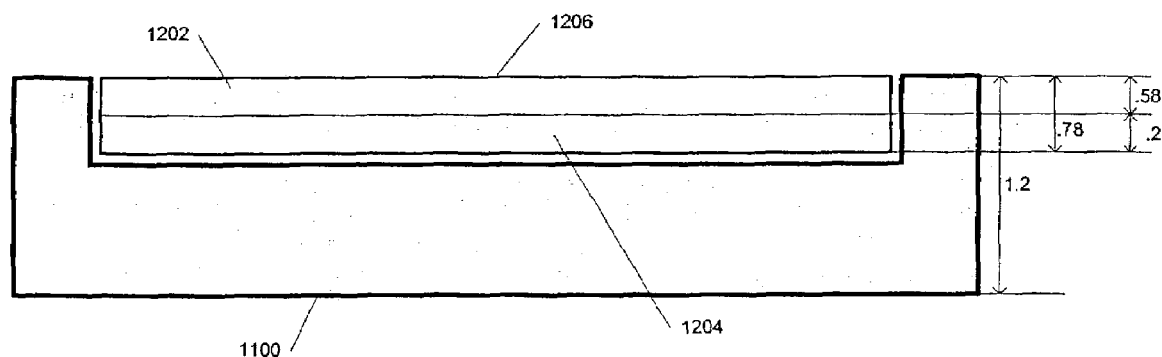
FIG. 12 is a diagram illustrating an example embodiment of a token configured in accordance with still another embodiment of the invention.

FIG. 1206 illustrates an embodiment of a thin mini-CD 1206 that comprises multiple laminate layers 1202 and 1204 so that thin mini-CD 1206 can in fact be embossed. In this embodiment, top layer 1202 is embossed as required. Layer 1204 includes the CD readable data. The two layers are then laminated to form a thin mini-CD 1206 that can be read by a conventional CD drive using carrier 1100 for example, as well as conventional card readers including smart card readers if needed, and also includes embossing. In the embodiment of FIG. 12, embossing layer 1202 is 0.5 mm thick and CD data layer 1204 is 0.28 mm thick so that combined, they are 0.78 mm thick just like thin mini-CD 1104.

Figure 10:
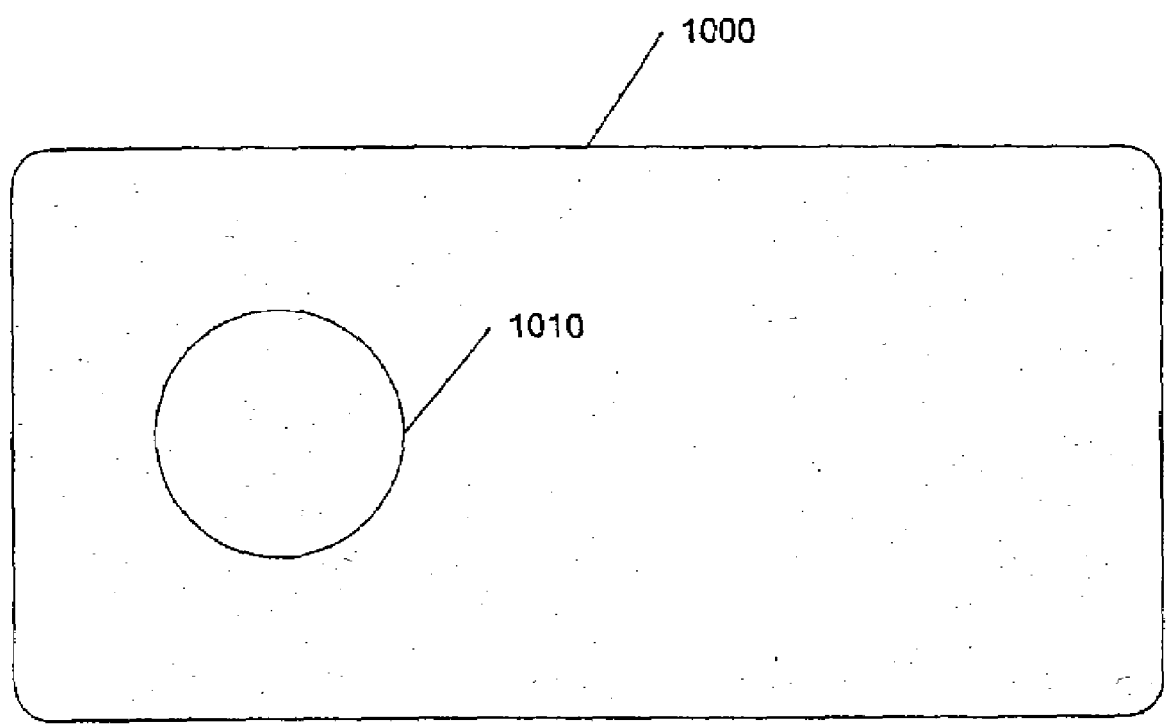
FIG. 10 is a diagram illustrating an example embodiment of a token configured in accordance with one embodiment of the invention.

Clearly, the example token embodiments of FIGS. 10-12 are by way of example only. Other implementations of the embodiments illustrated in FIGS. 10-12 are possible. Other token embodiments are also required for different types of standard input devices 104. Although, it should be clear, for example, that similar token 106 embodiments will work in a standard DVD drive as well.

In general, while certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed:

1. A method for enrolling a token used in an electronic transaction, the method comprising:
    interfacing the token comprising a token identifier with a terminal through a standard input device and automatically installing client software included with the token, comprising:
    checking for existing client software installations;
    installing the client software when no existing client software installations are found; and
    when an existing installation is found, checking a serial number of the existing installation to see if it matches a serial number associated with the client software and installing the client software only when the serial number of the existing installation does not match;
    automatically establishing a connection with an enrollment authority;
    automatically checking the enrollment status of the token with the enrollment authority;
    when the status check shows that the token is not enrolled, then generating a personal identifier; and
    transmitting an enrollment message comprising the personal identifier to the enrollment authority.

2. A method for enrolling a token used in an electronic transaction, the method comprising:
    interfacing the token comprising a token identifier with a terminal through a standard input device and automatically installing client software included with the token, comprising:
    checking for existing client software installations;
    installing the client software when no existing client software installations are found; and
    when an existing installation is found, checking versions of software modules associated with the current installation to see if they match versions of software modules comprising the client software, and only installing software modules for which the versions do not match;
    automatically establishing a connection with an enrollment authority;
    automatically checking the enrollment status of the token with the enrollment authority;
    when the status check shows that the token is not enrolled, then generating a personal identifier; and
    transmitting an enrollment message comprising the personal identifier to the enrollment authority.

3. The method of claim 1, wherein checking for existing installations further comprises, when an existing installation is found, checking a drive identification associated with the current installation.

4. The method of claim 1, wherein generating the personal identifier comprises receiving identifying information and including the identifying information in the enrollment message transmitted to the enrollment authority.

5. The method of claim 4, wherein automatically generating the personal identifier further comprises acquiring unique information from the token and including the unique information in the enrollment message transmitted to the enrollment authority.

6. The method of claim 1, further comprising prompting a user associated with the token to determine if the user wants to enroll the token, before generating the personal identifier.

7. The method of claim 1, further comprising encrypting the enrollment message transmitted to the enrollment authority.

8. The method of claim 1, wherein automatically establishing a connection with the enrollment authority comprises accessing a network address stored on the token and using the network address to establish the connection with the enrollment authority.

9. The terminal of claim 1, wherein the token comprises a chip configured to be read at a point of sale.

10. The method of claim 1, wherein the token can be read by a standard drive.

11. The terminal of claim 2, wherein the token comprises a chip configured to be read at a point of sale.

12. The method of claim 2, wherein the token can be read by a standard drive.

13. The method of claim 2, wherein checking for existing installations further comprises, when an existing installation is found, checking a drive identification associated with the current installation.

14. The method of claim 2, wherein generating the personal identifier comprises receiving identifying information and including the identifying information in the enrollment message transmitted to the enrollment authority.

15. The method of claim 14, wherein automatically generating the personal identifier further comprises acquiring unique information from the token and including the unique information in the enrollment message transmitted to the enrollment authority.

16. The method of claim 2, further comprising prompting a user associated with the token to determine if the user wants to enroll the token, before generating the personal identifier.

17. The method of claim 2, further comprising encrypting the enrollment message transmitted to the enrollment authority.

18. The method of claim 2, wherein automatically establishing a connection with the enrollment authority comprises accessing a network address stored on the token and using the network address to establish the connection with the enrollment authority.

* * * * *